United States Patent Office 3,510,149
Patented May 5, 1970

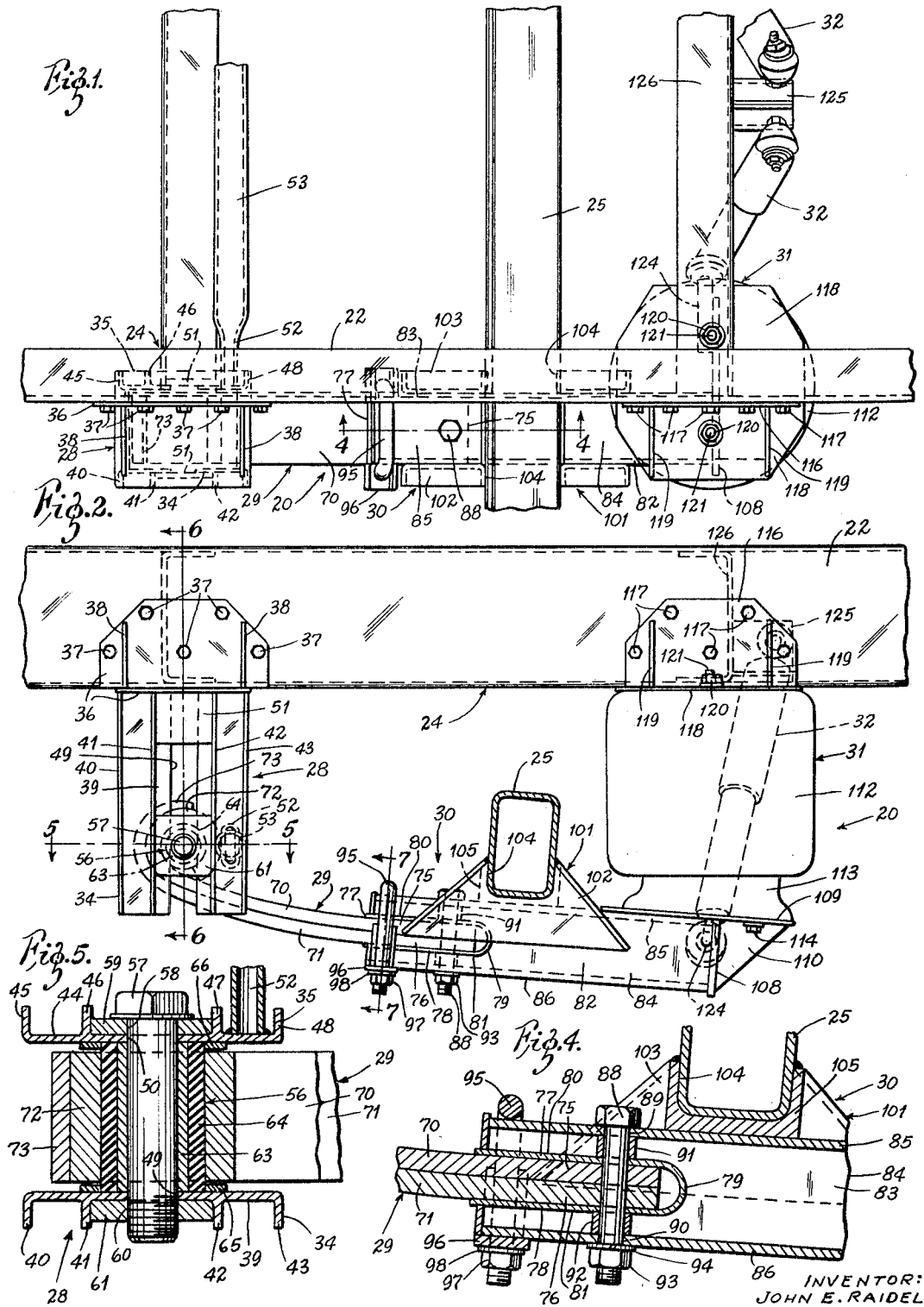
May 5, 1970     J. E. RAIDEL     3,510,149
ADJUSTABLE AIR SUSPENSION
Filed Oct. 4, 1967     3 Sheets-Sheet 1
INVENTOR:
JOHN E. RAIDEL,
By Kingsland, Rogers, Ezell, Eilers & Robbins
ATTORNEYS

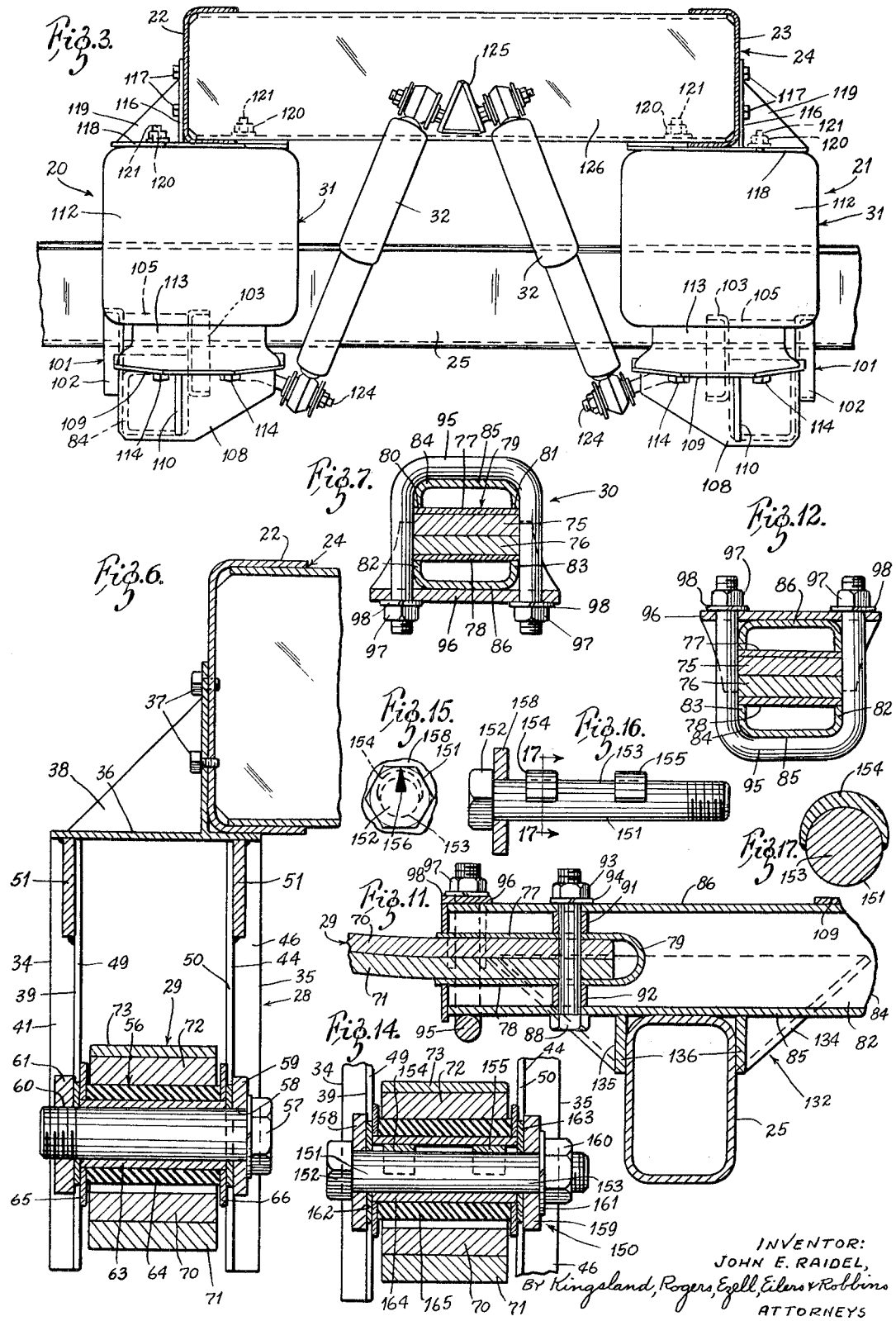

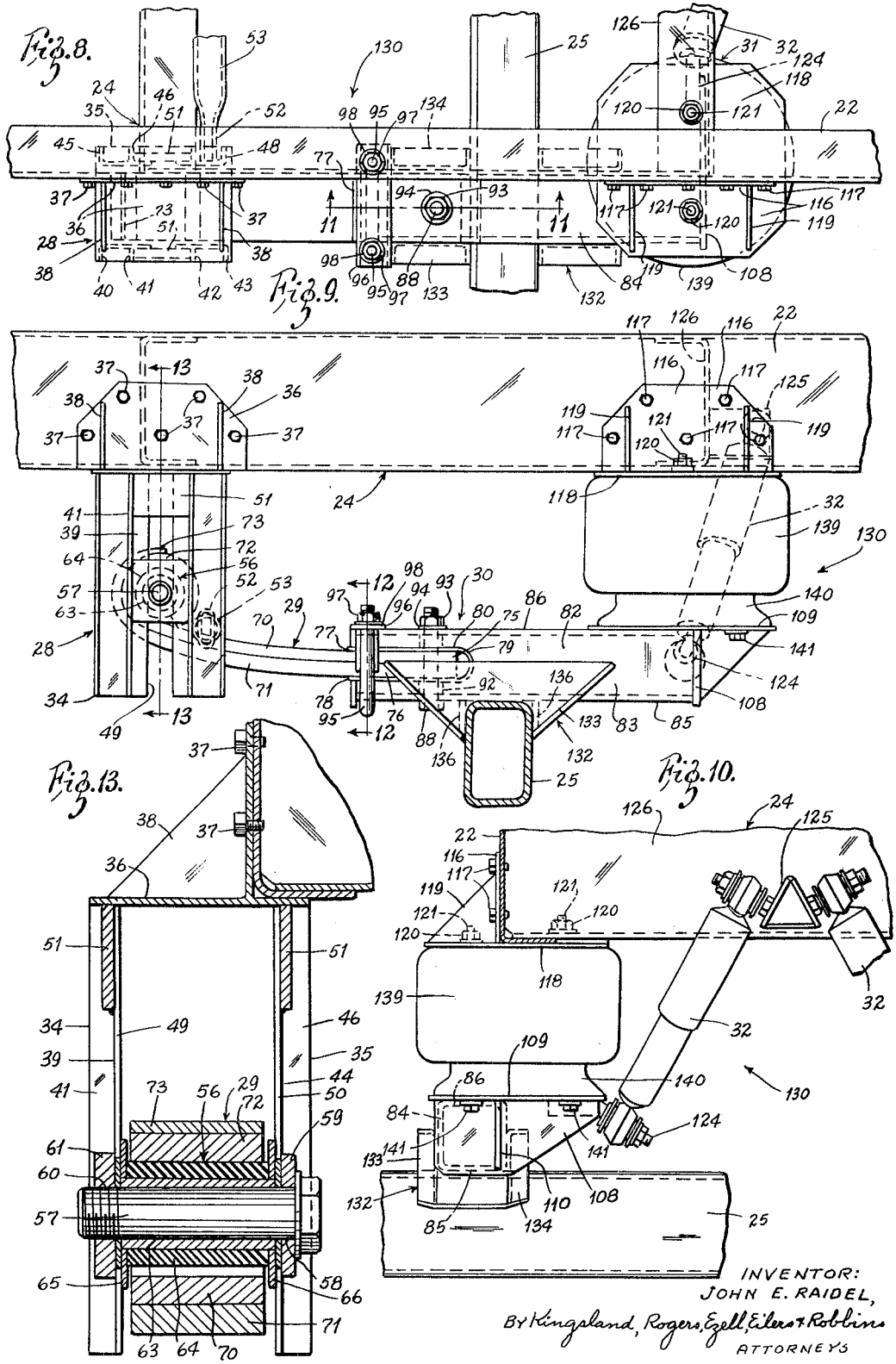

3,510,149
ADJUSTABLE AIR SUSPENSION
John E. Raidel, Rte. 9, Box 400-M,
Springfield, Mo. 65804
Filed Oct. 4, 1967, Ser. No. 672,817
Int. Cl. B60g 9/00
U.S. Cl. 280—124      6 Claims

ABSTRACT OF THE DISCLOSURE

A vehicle suspension assembly adjustable for different positions of the vehicle axle. The adjustability is provided by a mount that supports one end of the suspension assembly and is slidable on a hanger assembly to adjust the position of the suspension assembly. Also, certain parts of the suspension assembly are invertible for accommodating substantial variations in axle location. Adjustable eccentrics in the slidable mount permit alignment of the axle.

BRIEF DESCRIPTION OF THE INVENTION

The suspension assembly of this invention is designed to support a vehicle axle and cushion and dampen the shock forces. The purpose of this suspension assembly is to make it possible to use the same basic components for any given mounting height and for axle-underslung and axle-overslung applications, thereby eliminating the multiplicity of parts inventory required in conventional suspension designs. The suspension assembly comprises relatively few parts with reversible connections for relatively large variations in axle location and with an adjustable mount for smaller variations in axle location. The suspension assembly includes a generally vertical hanger suspended from the vehicle chassis with a bushing mount that can be locked at a selected position on the hanger according to small variations in location of the axle. An end of a torque spring is journaled about the bushing assembly, the other end of the torque spring being connected to a beam assembly that is joined to the axle and that is also connected to a spring, such as an air spring, the other end of which is connected to the vehicle chassis. For large variations in location of the axle, the beam assembly can be inverted. Also, the bushing mount comprises an eccentric cam support that can be rotated for alignment of the axle.

DESCRIPTION OF THE DRAWINGS

FIG. 1 is a top plan view of the left air suspension assembly;

FIG. 2 is a side elevation view of the left air suspension assembly;

FIG. 3 is a rear elevation view of the left and right air suspension assemblies;

FIG. 4 is an enlarged fragmentray view in section taken along the line 4—4 of FIG. 1;

FIG. 5 is an enlarged view in section taken along the line 5—5 of FIG. 2;

FIG. 6 is an enlarged view in section taken along the line 6—6 of FIG. 2;

FIG. 7 is an enlarged view in section taken along the line 7—7 of FIG. 2;

FIG. 8 is a top plan view of the left air suspension assembly as oriented for a low axle mount;

FIG. 9 is a side elevation view of the air suspension assembly of FIG. 8;

FIG. 10 is a front elevation view of the air suspension assembly of FIG. 8;

FIG. 11 is an enlarged fragmentary view in section taken along the line 11—11 of FIG. 8;

FIG. 12 is an enlarged view in section taken along the line 12—12 of FIG. 9;

FIG. 13 is an enlarged view in section taken along the line 13—13 of FIG. 9;

FIG. 14 is a fragmentary view in section similar to FIG. 6, but showing a modification of the bearing mount;

FIG. 15 is an end elevation view of the eccentric bolts for the modification of FIG. 14;

FIG. 16 is a side elevation view of the eccentric bolts; and

FIG. 17 is an enlarged view in section taken along the line 17—17 of FIG. 16.

DETAILED DESCRIPTION OF THE INVENTION

As shown in FIGS. 1, 2, and 3, the left and right air suspension assemblies 20 and 21 are mounted to the side members 22 and 23 of a vehicle chassis 24. The axle 25 of the vehicle is located below the chassis 24 by a distance that may vary.

The air suspension assemblies 20 and 21 are identical except they are oppositely assembled for left and right side mounting. Therefore, the details of only the left side air suspension assemblies 20 are shown. Its principal components comprise a hanger assembly 28, a torque spring assembly 29 connected between the hanger assembly 28 and a beam assembly 30. The beam assembly 30 is connected to the vehicle axle 25. The principal components also include an air spring assembly 31 of conventional design connected between the vehicle chassis 24 and the beam assembly 30, and a shock absorber 32, also of conventional design, connected between the vehicle chassis 24 and the beam assembly 30.

The hanger assembly 28 comprises a pair of extruded hanger rails 34 and 35, the upper ends of which are welded to a hanger bracket 36. The hanger bracket 36 is fastened by a plurality of bolts 37 to the chassis side member 22 and is suitably reinforced with gusset plates 38.

The hanger rail 34 is formed with a face plate 39 and outwardly facing parallel vertical webs 40, 41, 42, and 43. Similarly, the hanger rail 35 has a face plate 44 with inwardly facing vertical webs 45, 46, 47, and 48. The face plates 39 and 44 have central slots 49 and 50, respectively, extending their full heights, with plates 51 welded across the upper portions of the slots 49 and 50. One end 52 of a pipe brace 53 is welded to the face plate 44 between the webs 47 and 48. The other end of the pipe brace 53 is welded to the opposing corresponding hanger rail of the right air suspension assembly 21.

A bushing assembly 56 is mounted between the hanger rails 34 and 35. The bushing assembly 56, as shown in FIGURES 5 and 6, comprises a cap screw or bolt 57 extending through a hole 58 in a plate 59 positioned between the webs 46 and 47 and bearing against the face plate 44. The bolt 57 extends within the slots 49 and 50 and is threaded into a tapped hole 60 in another plate 61 positioned between the webs 41 and 42 and bearing against the face plate 39. Once the location of the plates 59 and 61 has been selected, as will be described hereinafter, they are welded in place. A metal sleeve 63 surrounds the bolt 57, and a rubber bushing 64 surrounds the sleeve 63. There are washers 65 and 66 at each end of the rubber bushing 64.

The torque spring 29 comprises a pair of spring members 70 and 71 welded together. An end 72 of the upper spring member 70 is wound about the rubber bushing 64. An end 73 of the other spring member 71 is partially wound about the end 72 of the spring member 70.

The other ends 75 and 76 of the spring members 70 and 71 are positioned between the sides 77 and 78 of a U-plate 79. The U-plate 79 is mounted within slots 80 and 81 cut in the sides 82 and 83 of a hollow rectangular beam member 84, the beam member 84 being part of the beam assembly 30. The beam member 84 also has top and bottom sides 85 and 86. A bolt 88 extends through holes 89 and 90 in the top and bottom walls 85 and 86 of the beam 84 and also extends through appropriate holes in the sides 77 and 78 of the U-plate 79 and in the spring members 70 and 71, all as shown in FIG. 4. There are spacer sleeves 91 and 92 around the bolt 88 and positioned between the U-plate 79 and the upper and lower sides 85 and 86 of the beam 84. The bolt 88 is fastened in place by a nut 93 and lockwasher 94. The spring members 70 and 71 are also further locked in place by a U-bolt 95 extending around the top 85 and sides 82 and 83 of the beam 84 and through holes in a plate 96. Nuts 97 and lockwashers 98 complete the U-bolt assembly, locking the torque spring 29 to the beam 84.

The beam assembly 30 also includes an axle support 101 comprised of two opposed flanged triangular plates 102 and 103 having central slots 104 within which the axle 25 is located. A U-shaped block 105 is welded between the flanged plates 102 and 103 and the axle 25 is seated within the block and welded to it.

A vertical end plate 108 is welded to the end of the beam 84. An air spring mounting plate 109 is welded to the top 85 of the beam 84, extending beyond the end of the beam. A reinforcing gusset plate 110 is welded to the end plate 108 and the extending portion of the air spring mounting plate 109.

The air spring 31 is of conventional design, having an air spring body 112 above a base 113. The base 113 is mounted by bolts 114 to the air spring mounting plate 109. An upper mounting bracket 116 is fastened by bolts 117 to the side member 22 of the truck chassis. The bracket 116 includes a horizontal plate 118 and reinforcing gussets 119. The upper side of the air spring body 112 is fastened to the plate 118 by nuts 120 threaded onto studs 121.

The shock absorber 32 is standard. It is mounted between a bottom mounting stud 124 which is welded to the end plate 108 and a top mounting bracket 125 which is welded to a cross member 126 of the vehicle chassis. The location of the shock absorber 32 may be changed as required or desired for purposes known in the art.

FIGS. 8–13 show another air suspension assembly 130 which is similar to the air suspension assembly 20 except that the parts have been rearranged to accommodate a lower position of the axle 25. In the air suspension assembly 130, all or nearly all of the parts of the assembly 20 are used and, hence, duplicate reference characters have been retained in FIGS. 8–13. To accommodate the substantially lower position of the axle 25 compared to its position in FIG. 2, the beam assembly 30 has been inverted in FIGS. 8–13. This is done by simply removing the U-bolt 95 and the bolt 88 and inverting the beam 84 from the position illustrated in FIG. 2 to the position illustrated in FIG. 9, thereafter replacing the U-bolt 95 and the bolt 88. Also, the end plate 108 and spring support plate 109 are broken loose from the beam 84 and reoriented as illustrated in FIG. 9 and again welded in place.

As shown in FIGS. 9 and 11, the axle support 132 corresponding to the axle support 101 in FIG. 2 may be similar in having opposed flanged plates 133 and 134 with slots 135 in them for receiving vertical plates 136 welded within the slots 135 and to the axle 25. The change in FIG. 11 is the substitution of the plates 136 for the block 105 shown in FIG. 4, although the location of the axle 25 may permit use of the same axle support 101 as in FIG. 2, inverted with the beam 84 as shown in FIG. 11.

As illustrated in FIG. 9, an air spring 139 of somewhat different shape may be substituted for the air spring 31, but a suitable base 140 is still fastened to the spring support plate 109 by a plurality of bolts 141, and the same bracket 116 may be used to connect the air spring 139 to the chassis. Likewise, similar shock absorbers 32 and mounts therefor may be used. Thus, FIGS. 8–13 show that substantially all the components of the air suspension system can be used, with some components simply reversed when the vehicle axle is low relative to the chassis.

FIGS. 14–17 illustrate an important modified form of bushing assembly 150 which may be substituted for the bushing assembly 56 illustrated in FIGS. 6 and 13.

In the bushing assembly 150, a bolt 151 is used, and as shown in FIGS. 15, 16, and 17, the bolt 151 has a head 152 and shank 153 with a pair of cam members 154 and 155 welded to the shank 153 and projecting to one side. The cam members 154 and 155 act as eccentrics. An arrow 156 is drawn or stamped in the face of the bolt head 152 and points to the central high rise of the cam eccentrics 154 and 155.

The bushing assembly 150 is installed between the hangers 35 and 34 as described in connection with FIG. 5, with the bolt 151 extending through two plates 158 and 159 that in turn are spot welded to the hangers 34 and 35. A nut 160 and lockwasher 161 are used to tighten the bolt 151 in place. A pair of narrower plates 162 and 163 are welded to the inner faces of the plates 158 and 159 and ride within the slots 49 and 50 of the hangers 34 and 35. A metal sleeve 164 surrounds the shank 153 of the bolt and the cam eccentrics 154 and 155, and a rubber bushing 165 surrounds the sleeve 164. The ends 72 and 73 of the spring elements 70 and 71 are wrapped about the rubber bushing 165 the same as described in connection with FIGS. 2 and 5.

Installation and use

For the installation of the air suspension assemblies of this invention, it is first determined whether or not the axle 25 is to be relatively high as illustrated in FIG. 2 or relatively low as illustrated in FIG. 9. For the relatively high axle assembly, the beam 84 and axle support 101 are oriented as shown in FIG. 2, the beam 84 is connected to the torque spring 29 by the bolt 88 and the U-bolt 95, and the spring support 101 is welded to the axle 25. With the air spring 31 connected to the bracket 116 and suspended from the chassis 24, the beam 84 is bolted to the base 113 of the air spring 31.

Now, when the bushing assembly 56 or the bushing assembly 150 has been assembled, and with the spring ends 72 and 73 wrapped about the rubber bushing 64 or the rubber bushing 165, the bushing assembly 56 or the bushing assembly 150 is adjusted vertically relative to the hanger assembly 28 until the desired elevation of the axle 25 is reached. Then the bolt 57 is tightened and the plates 59 and 61 are spot welded in place. If the bushing assembly 150 is used, the nut 160 is tightened against the lockwasher 161 and the plates 158 and 159 are spot welded in place. Either bushing assembly 56 or 150 thus provides relatively fine adjustment of the elevation of the axle 25.

The advantage of the bushing assembly 150 is that it also permits alignment of the axle 25 upon completion of the before-described installation. When the axle position has been determined and the plates 158 and 159 spot welded to the hangers 34 and 35, the nut 160 can be loosened and the bolt 151 can be rotated. Rotation of the bolt 151 in the bushing assembly on either side of the vehicle permits accurate alignment of the axle 25, because as the bolt 151 is rotated, the cam eccentrics 154 and 155 change the location of the bushing 165 and therefore the location of the torque spring 29. The amount of change that can be produced by rotation of the bolt 151 is adequate to enable accurate alignment of the axle 25. When the proper alignment has been achieved, the nut 160 is again tightened against the lockwasher.

For relatively lower axle positions, the installation is similar except, as illustrated in FIGS. 8–13, and as has been described, the beam 84 is inverted to reverse the position of the bracket 101 or, if it is used, the bracket 132. Subsequent adjustments of the height of the axle by adjusting the position of the bushing assembly 56 or 150 and alignment of the axle 25 are as has been described.

In any installation of the suspension assembly of this invention, the air spring 31 or 139 and the torque spring both isolate shock forces. Hence, the invention provides an adjustable suspension assembly that can accommodate varying heights of axle locations with provisions for aligning the axle, and with relatively few parts that are easy to assemble and are interchangeable for the different axle locations.

What is claimed is:

1. A vehicle suspension assembly for installation on any one of several different vehicles of different constructions and capable of accommodating different axle heights on the different vehicles comprising a hanger support adapted to be suspended from a vehicle chassis, a bearing, means for adjusting the vertical position of the bearing relative to the hanger support to accommodate variations in axle spacing from the vehicle chassis, means for locking the bearing to the hanger support in a selected position, a resilient shock force damper, means to connect the shock force damper between an axle of the vehicle and the vehicle chassis, means for journaling an end of the shock force damper to the bearing, the hanger support comprising a pair of spaced slotted plates, a pair of blocks, the plates being between the blocks, the bearing having projections extending through the slots and connected to the blocks, and means to tighten the blocks against the slotted plates.

2. The vehicle suspension assembly of claim 1 wherein the shock force damper comprises a leaf spring and a beam, one end of the leaf spring being journaled to the bearing, the other end of the leaf spring being connected to the beam, means for connecting the beam to the axle, and spring means between the beam and the vehicle chassis.

3. The vehicle suspension assembly of claim 2 wherein the spring means comprises an air spring.

4. The vehicle suspension assembly of claim 2 wherein the means connecting the beam to the leaf spring comprises means defining a recess in an end of the beam for receiving an end of the leaf spring, and bolt and clamp means for releasably locking the leaf spring within the recess.

5. The vehicle suspension assembly of claim 1 including means defining two vertical webs on each plate spaced laterally of the slot, each block being located between two webs and having straight sides slidable in close proximity to the webs.

6. The vehicle suspension assembly of claim 1 wherein the bearing includes an eccentric rotatably mounted between the two plates to enable fine adjustment of the bearing.

References Cited

UNITED STATES PATENTS

| 1,609,595 | 12/1926 | Anderson | 267—54 |
| 2,552,951 | 5/1951 | Freeman | 280—43 X |
| 3,361,445 | 1/1968 | Harbers | 280—124 |
| 3,390,895 | 7/1968 | Verdi. | |

A. HARRY LEVY, Primary Examiner

U.S. Cl. X.R.

267—18, 54, 56; 280—43